United States Patent [19]

Charles et al.

[11] Patent Number: 5,415,080
[45] Date of Patent: May 16, 1995

[54] COFFEE MAKER WITH WATER RECYCLING SHAFT

[75] Inventors: Patrick Charles, Louoy; Jean-Michel Dulout, Luz Saint Sauveur, both of France

[73] Assignee: SEB S.A., Selongey Cedex, France

[21] Appl. No.: 215,765

[22] Filed: Mar. 22, 1994

[30] Foreign Application Priority Data

Mar. 24, 1993 [FR] France ................. 93 03635

[51] Int. Cl.⁶ .............................. A47J 31/00
[52] U.S. Cl. ........................ 99/299; 99/305; 99/307
[58] Field of Search ............ 99/295, 299, 300, 302 R, 99/304, 305, 306, 307, 316; 426/433

[56] References Cited

U.S. PATENT DOCUMENTS

| | | | |
|---|---|---|---|
| 4,328,740 | 5/1982 | McDonough | 99/305 |
| 4,464,981 | 8/1984 | Stover. | |
| 4,531,046 | 7/1985 | Stover | 99/305 |
| 4,790,240 | 12/1988 | Henn et al. . | |

FOREIGN PATENT DOCUMENTS

| | | |
|---|---|---|
| 0287780 | 2/1988 | European Pat. Off. . |
| 2932053 | 2/1981 | Germany . |
| 290481 | 6/1928 | United Kingdom . |

*Primary Examiner*—Robert W. Jenkins
*Attorney, Agent, or Firm*—Spensley Horn Jubas & Lubitz

[57] ABSTRACT

An electric beverage maker comprising: a water reservoir; a water delivery tube for conducting hot water from the reservoir; a water distribution chamber located above a location of a filter holder and disposed for receiving water from the water delivery tube, the chamber being provided with a water outlet opening; a water recycling conduit providing a water flow path between the water distribution chamber and the reservoir; and a valve for blocking or unblocking the water outlet opening for permitting, when the water outlet opening is blocked, recycling of water via the recycling conduit, the improvement wherein the recycling conduit is constituted by a guide member forming a channel enclosing the water delivery tube.

10 Claims, 3 Drawing Sheets

COFFEE MAKER WITH WATER RECYCLING SHAFT

BACKGROUND OF THE INVENTION

The present invention relates to the general technical field of hot beverage machines and in particular electric coffee makers, in which the preparation of the beverages obtained by lixiviation of a ground product, such as ground coffee, in a hot liquid, generally water, serving as a solvent.

The present invention is more particularly directed to an electric coffee maker which includes water heating means, a water reservoir, a water distribution chamber having at least one water distribution outlet opening, a tube for conducting water upwardly from the reservoir to the distribution chamber, a filter holder supported below the water distribution chamber, a water recycling conduit connecting the water distribution chamber to the reservoir, and a valve for controlling the blocking or unblocking of the water distribution outlet opening so as to permit, when the outlet opening is blocked, recycling of the water via the recycling conduit.

Coffee makers provided with a water recycling system have been developed in order to prevent water which is not sufficiently hot, particularly at the start of an operating cycle, from being brought into contact with the ground product, i.e. ground coffee, in which event the result would be the production of a beverage not having its most desired temperature. In effect, in coffee makers which do not have a recycling system, it has been found that the final temperature of the beverage in the serving container, or carafe, is substantially lower than in machines provided with such a system. In addition, it is recognized that the optimum extraction of soluble components from the ground coffee is obtained when the temperature of the water passing through the ground product is held constant and is sufficiently high for the entire duration of the operating cycle of the coffee maker.

German Patent C-2932053 describes an electric coffee maker of the filter type which includes a reservoir, water heating means, and a water distribution chamber situated above a filter holder and provided with a control valve for controlling the opening and closing of an outlet opening of the water distribution chamber, the outlet opening being located above the filter holder. The machine described includes a system for recycling water which has not achieved the desired temperature. The recycling system consists of a recycling conduit connecting the water distribution chamber to the reservoir.

The control valve includes a bimetallic element in contact with water in the water distribution chamber. The bimetallic element is deflected to open the water outlet opening when the water has achieved a sufficiently high temperature. During operation of the coffee maker, water arriving in the water distribution chamber is continually recycled to the reservoir via the conduit for as long as the desired temperature has not been attained.

Known coffee makers designed according to this principle permit, to a certain extent, the attainment of a satisfactory beverage temperature and one can consider that the extraction of essences from the ground coffee is equally effected under acceptable conditions. However, it has been found that the total duration of an operating cycle, and in particular that of the water preheating phase, is considered unacceptably long in view of the heat losses occurring at the level of the conduits for recycling and raising the water. It has equally been noted that during the course of operation of such machines, the water is subjected to an excessive degree of evaporation over its return path from the reservoir toward the heater, producing characteristic noise which is considered objectionable by users.

SUMMARY OF THE INVENTION

It is an object of the present invention to eliminate, or at least significantly reduce, the shortcomings noted above.

A more specific object of the invention is to provide a novel electric beverage maker which employs water recycling and in which the duration of the water preheating cycle and more generally the complete beverage making cycle, is reduced.

Another specific object of the invention is to reduce vaporization in such beverage maker.

A further specific object of the invention is to reduce the noise level during operation of the beverage maker.

Yet another object of the invention is to provide an electric beverage, e.g. coffee, maker in which the temperature of the water, as well as the recycling of the water into the heating means, and into the means for distributing the water over the ground product are achieved in an optimal manner.

A complementary object of the invention is to provide an electric beverage maker permitting the attainment, from the start of an operating cycle, of a brewed product, such as coffee, having a temperature substantially equivalent to the temperature of the beverage at the end of the cycle.

Another object of the invention is to provide an electric beverage maker in which control of the water recycling and of its distribution are assured with the aid of a bimetallic element which can be installed and which provides a seal in particularly simplified ways.

These and other objects of the invention are achieved in an electric beverage maker comprising: a water reservoir; a water delivery tube for conducting hot water from the reservoir; a water distribution chamber located above a location of a filter holder and disposed for receiving water from the water delivery tube, the chamber being provided with a water outlet opening; a water recycling conduit providing a water flow path between the water distribution chamber and the reservoir; and a valve for blocking or unblocking the water outlet opening for permitting, when the water outlet opening is blocked, recycling of water via the recycling conduit, by the improvement wherein the recycling conduit is constituted by a guide member forming a channel enclosing the water delivery tube.

Other details and advantages of the invention will become more readily apparent from the following detailed description presented with reference to the attached drawings and given by way of an illustrative and non-limiting example.

DESCRIPTION OF THE PREFERRED EMBODIMENTS

Figure 1:
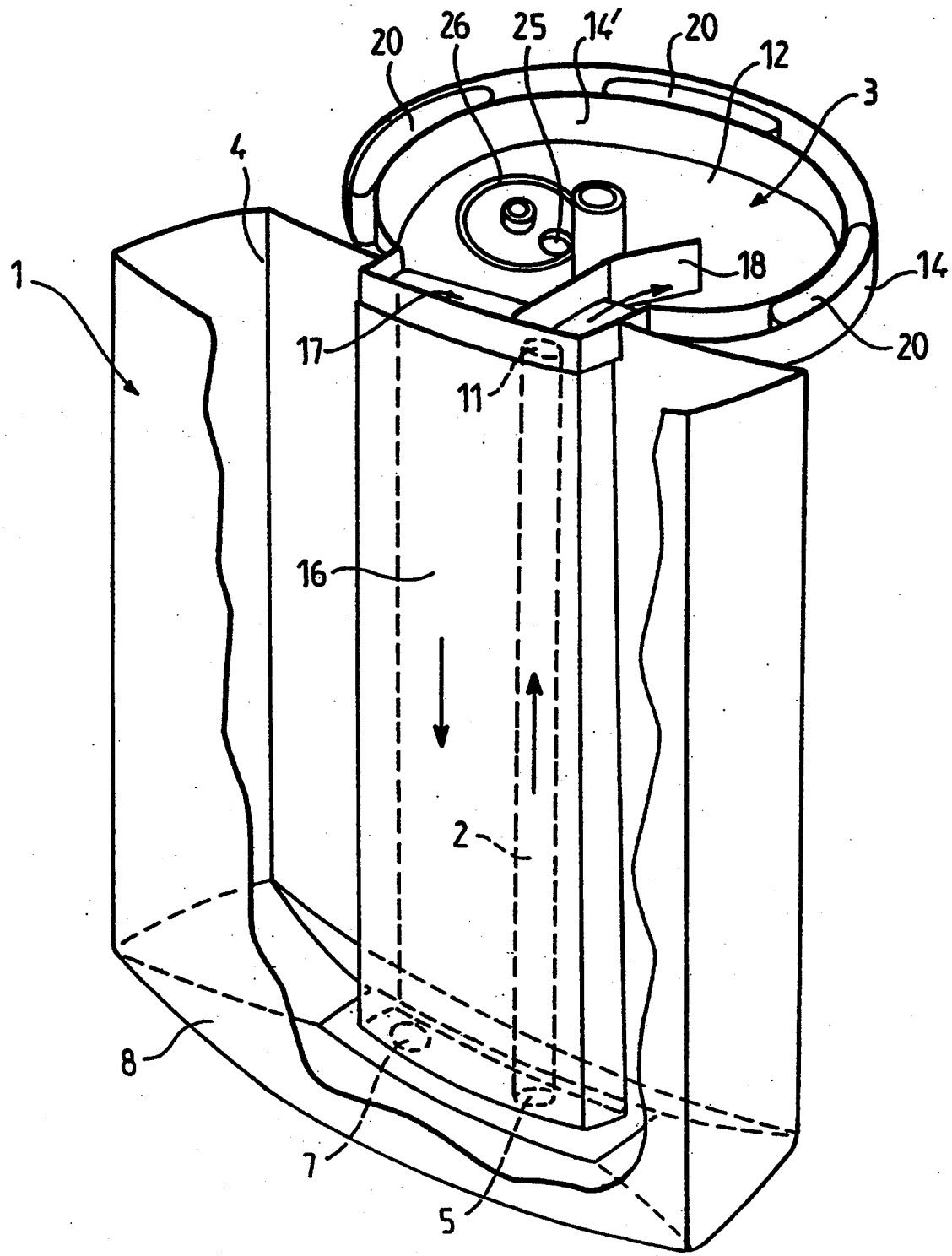
FIG. 1 is a perspective view of the principle components of an electric coffee maker according to the invention, provided with a recycling channel.

FIG. 1 shows the principle elements of a coffee machine according to the invention and including a reservoir 1 mounted at the rear portion of the coffee maker and intended to be filled with the water necessary for making a pot, or carafe, of coffee.

The coffee maker also includes a tube 2 connecting reservoir 1 to a water distribution chamber 3 situated adjacent the upper end 4 of reservoir 1. As is known in the art, when water is heated in reservoir 1, the hot water will be conducted upwardly through tube 2 into the interior of water distribution chamber 3. Water distribution chamber 3 projects in a cantilever fashion from upper end 4 in order to overhang a filter holder (not shown in the drawing). The filter holder is constructed in a conventional manner to be held above a carafe (also not shown in the drawing), the carafe in turn resting on a heating plate within which are installed suitable heating means (also not shown in the drawing) such as a horseshoe shaped sheathed heating resistance. The filter holder, carafe and heating plate are not illustrated because they are conventional in the art.

The heating resistance may be thermally coupled with a water heating tube having one end coupled in fluid flow communication with inlet end 5 of tube 2, the other end of the heating tube being in fluid flow connection with an evacuation hole 7. Hole 7 is formed in the bottom 8 of reservoir 1 and serves to remove water from reservoir 1 toward the heating means. When water is heated in the heating tube, it will be caused to flow upwardly through tube 2 and into distribution chamber 3.

Figure 2:
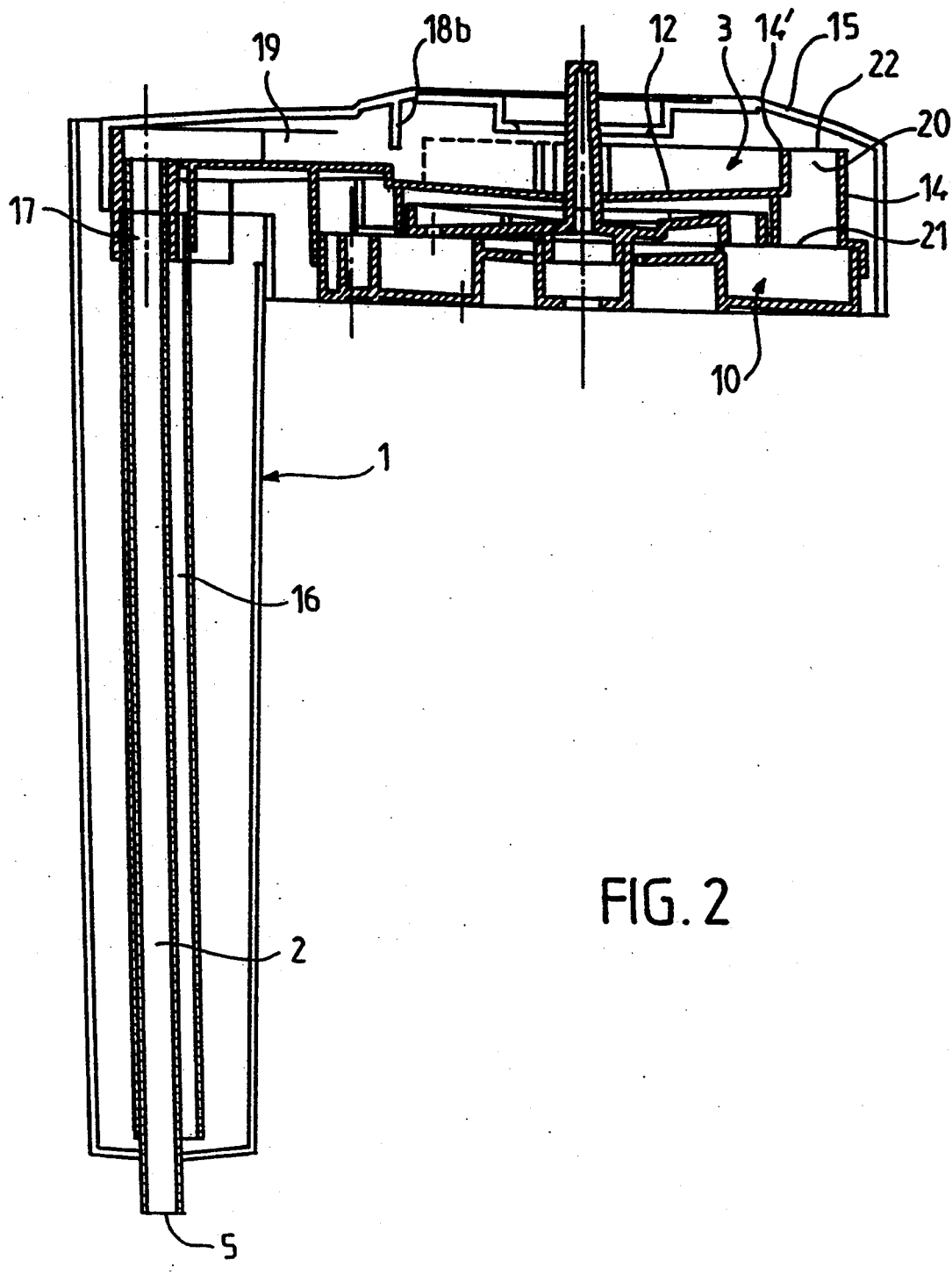
FIG. 2 is an elevational, cross-sectional detail view showing the structure of the coffee maker of FIG. 1.

Water distribution chamber 3 has, for example, a substantially cylindrical form and is bounded by a lower wall 12 and by an exterior side wall 14, and is closed at the top by a top wall 15 forming a cover for water distribution chamber 3, as shown particularly in FIG. 2.

Tube 2, which preferably is straight, has a vertically oriented longitudinal direction and a circular cross section, presents a water outlet 11 at its upper end, water outlet 11 being situated substantially at the level of lower wall 12 of water distribution chamber 3. Tube 2 extends through reservoir 1 starting from water distribution chamber 3 and substantially over the entire height of reservoir 1. Advantageously, tube 2 is coupled directly by its inlet end with the outlet of the heating tube associated with the heating resistance, the heating tube thus indirectly coupling, or linking, reservoir 1 with water distribution chamber 3 with the heating means functionally interposed therebetween.

The described coffee maker according to the invention includes a water recycling conduit constituted by a channel 16 which preferably forms a linear flow path, extends at least partially in reservoir 1, and is preferably oriented so that the flow path which it defines extends vertically from water distribution chamber 3 substantially to the bottom 8 of reservoir 1 in order to end in the vicinity of bottom 8, and for example at a distance of the order of several millimeters from bottom 8. Channel 16 has a cross section which may be for example substantially rectangular and in all cases has a cross-sectional area greater than that of tube 2. Channel 16 is mounted in reservoir 1 and for example at a distance from the walls of reservoir 1, and in such a manner that tube 2 extends within the interior of channel 16 along its entire height so that channel 16 constitutes a type of jacket or sheath for tube 2.

Channel 16 is fixed at the level of its upper end 17, forming a flow opening, by any appropriate means to water distribution chamber 3, and is coupled with water distribution chamber 3 by a water distribution channel 19. Channel 19 is fixed relative to water distribution chamber 3 in a manner such that the top edge of lower wall 12 is situated substantially in the same plane as flow opening 17.

Figure 3:
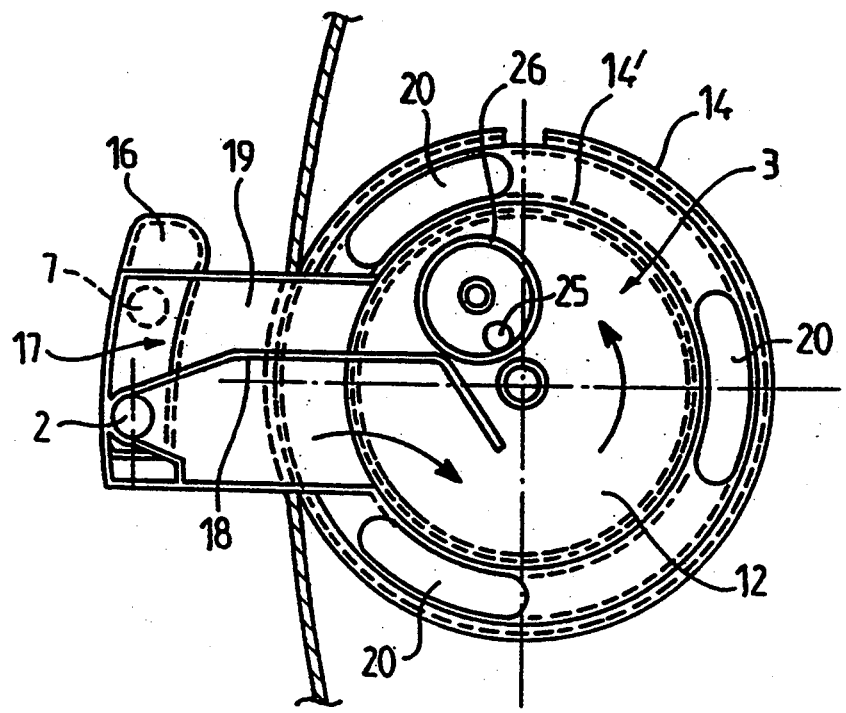
FIG. 3 is top plan view showing details of the embodiments of FIGS. 1 and 2, with certain machine components removed.

Evacuation hole 7 and channel 16 are disposed relative to one another in a manner such that evacuation hole 7 is located directly beneath channel 16. Advantageously, a separation wall 18, as shown in FIGS. 1 and 3, is provided in water distribution chamber 3 at the upper portion of channel 16 in order to channel the water exiting from tube 2 into water distribution chamber 3. Separation wall 18 extends into water distribution channel 19 so that water flows into water distribution chamber 3 before having the possibility of reaching flow opening 17.

Separation wall 18 thus separates water distribution channel 19 into two sections permitting the flow of water from tube 2 to not interfere with the recycling flow of water from water distribution chamber 3 into channel 16 via flow opening 17.

Figure 4:
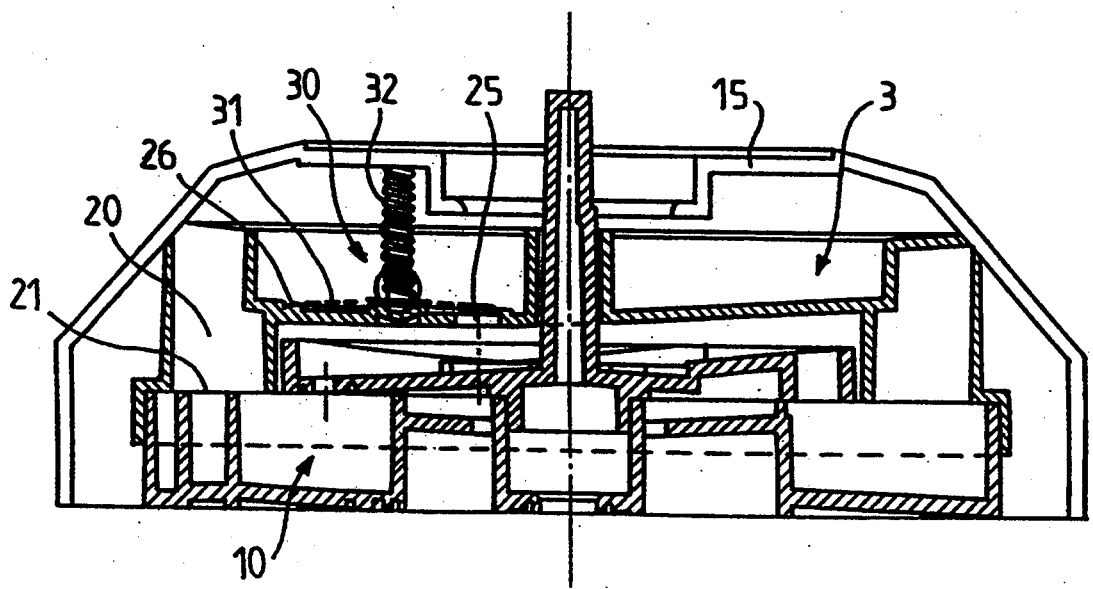
FIG. 4 is an elevational, cross-sectional detail view, to a larger scale than FIG. 2, showing one specific embodiment of a water distribution chamber of a coffee maker according to the invention.

Water distribution chamber 3 preferably includes an internal wall 14' defining with side wall 14 an annular zone within which there are disposed at least one, and preferably three, preheating shafts, or chimneys, 20. As shown in FIGS. 2 and 4, each chimney 20 communicates via a vapor outlet 21 with a water distribution device 10 situated beneath water distribution chamber 3. Each chimney 20 defines in its upper part a vapor inlet 22 extending in proximity with top wall 15. Chimneys 20 permit vapor created by the hot water arriving in water distribution chamber 3 to be evacuated downstream of that chamber, preferably into water distribution device 10 in order to assure its preheating.

Advantageously, it is also possible in order to improve preheating, to provide, in proximity with flow opening 17, a vapor recovery wall, or barrier, 18b, as shown particularly in FIG. 2. Such a wall has a lower edge located above lower wall 12 in order to allow water to pass into channel 16, and prevents a part of the vapor, or steam, from escaping outside of water distribution chamber 3 in order to be directed preferentially toward chimneys 20.

Water distribution chamber 3 includes in its lower wall 12 an orifice or opening 25, preferably of circular form, for distributing water to the filter holder. Orifice 25 is surrounded by a sealing lip 26 which is formed in, and projects upwardly from, lower wall 12. At least a portion of lip 26 is spaced from outlet opening 25. Sealing lip 26 preferably has a circular form. The passage of water through water distribution opening 25 is controlled by a control valve 30 constituted by a bimetal strip 31 mounted to be elastically movable into a position in which it forms a fluid tight seal with lip 26. Bimetal strip 31 can rest in a manner to form a fluid tight seal on the upper edge of lip 26 and is maintained in an elastic bearing relation with lip 26 by means of a compression spring 32 interposed between strip 31 and top wall 15 and surrounding a support shaft fixed to strip 31. The material of strip 31 is selected in a manner to undergo a deformation sufficient, at a selected temperature, to permit unblocking of outlet opening 25 in order to permit passage of water therethrough.

The operation of apparatus according to the invention will now be described.

Water heated by the heating means (not illustrated) is propelled upwardly, at the start of an operating cycle, into tube 2, and then into water distribution chamber 3 via water outlet 11. As long as the water is not at a sufficient temperature which corresponds to the opening temperature controlled by strip 31, the water is recycled via channel 16 and its flow opening 17, back into reservoir 1. During the course of this operating cycle, the temperature of the water progressively increases and reaches the temperature which initiates deformation of strip 31 to permit unblocking of outlet opening 25 in order to permit flow of water into water distribution device 10, and then into the ground product, such as ground coffee.

The presence in channel 16 of water whose temperature increases progressively permits the creation around tube 2 of a cushion of water which is proportionally hotter than the average temperature of the water contained in reservoir 1. Thus, it has been found that for a temperature value of 90° C. for deforming strip 31 to unblock opening 25, the temperature of the water around tube 2 rose to a value of the order of 80° C. just before movement of bimetal strip 31 to its open state, while water in reservoir 1 was at a temperature of the order of 40° C. This particular characteristic has for its consequence to reduce the thermal losses around tube 2 and, consequently, to strongly reduce the total operating time required to produce a pot of coffee.

Furthermore, water evacuated with priority via evacuation hole 7 derives for the most part from the water contained in channel 16, which is at a temperature higher than the average temperature in reservoir 1. This has as its result to preferentially withdraw, toward the heating means, water having a relatively high temperature and this permits avoidance or strong reduction of any risk of water vaporization. This phenomenon is particularly effective when the heating means have attained their average operating temperature and contributes significantly to reducing the noise level of the coffee maker according to the invention. The reduction of noise level is particularly effective at the end of an operating cycle when only a little water remains in reservoir 1.

This application relates to subject matter disclosed in French Application number 9303635, filed on Mar. 24, 1993, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. In an electric beverage maker comprising: a water reservoir; a water delivery tube for conducting hot water from the reservoir; a water distribution chamber located above a location of a filter holder and disposed for receiving water from the water delivery tube, the chamber being provided with a water outlet opening; a water recycling conduit providing a water flow path between the water distribution chamber and the reservoir; and a valve for blocking or unblocking the water outlet opening for permitting, when the water outlet opening is blocked, recycling of water via the recycling conduit, the improvement wherein said recycling conduit is constituted by a guide member forming a channel enclosing said water delivery tube.

2. Beverage maker as defined in claim 1 wherein said guide member extends at least in part through said reservoir.

3. Beverage maker as defined in claim 1 wherein said reservoir has a bottom and said guide member extends from said distribution chamber substantially to said bottom of said reservoir and terminates in the vicinity of said bottom.

4. Beverage maker as defined in claim 1 wherein said channel formed by said guide member and said water delivery tube both extend substantially vertically and said water delivery tube extends from said distribution chamber over substantially the entire vertical dimension of said guide member.

5. Beverage maker as defined in claim 1 wherein said reservoir has a bottom provided with a water evacuation hole disposed substantially in line with said guide member.

6. Beverage maker as defined in claim 1 wherein said water distribution chamber comprises at least one preheating channel for the passage of steam from downstream of said water distribution chamber.

7. Beverage maker as defined in claim 6 wherein said water distribution chamber has an upper wall and a periphery and there are three preheating channels disposed around said periphery of said water distribution chamber, with each said preheating channel having a vapor inlet in proximity to said upper wall and a vapor outlet.

8. Beverage maker as defined in claim 1 wherein said water distribution chamber has a water flow opening communicating with said guide member and a vapor recovery wall in proximity to said flow opening.

9. Beverage maker as defined in claim 1 wherein said valve comprises a bimetallic member which is elastically movably mounted relative to said water outlet opening, said member having a closing position for sealing said water outlet opening.

10. Beverage maker as defined in claim 9 wherein said water distribution chamber further comprises a sealing lip surrounding said water outlet opening, and wherein said bimetallic member is mounted to bear against said sealing lip for blocking said water outlet opening.

* * * * *